May 6, 1958 N. W. PARKER 2,833,853

COLOR TELEVISION

Filed Oct. 24, 1952 2 Sheets-Sheet 1

INVENTOR.
Norman W. Parker
BY
Norman L. Mueller
Atty.

May 6, 1958 N. W. PARKER 2,833,853

COLOR TELEVISION

Filed Oct. 24, 1952 2 Sheets-Sheet 2

INVENTOR.
Norman W. Parker
BY
Foorman L. Mueller
Atty.

United States Patent Office 2,833,853

Patented May 6, 1958

2,833,853

COLOR TELEVISION

Norman W. Parker, Park Forest, Ill., assignor to Motorola, Inc., Chicago, Ill., a corporation of Illinois Application October 24, 1952, Serial No. 316,690

5 Claims. (Cl. 178—5.4)

Figure 1:
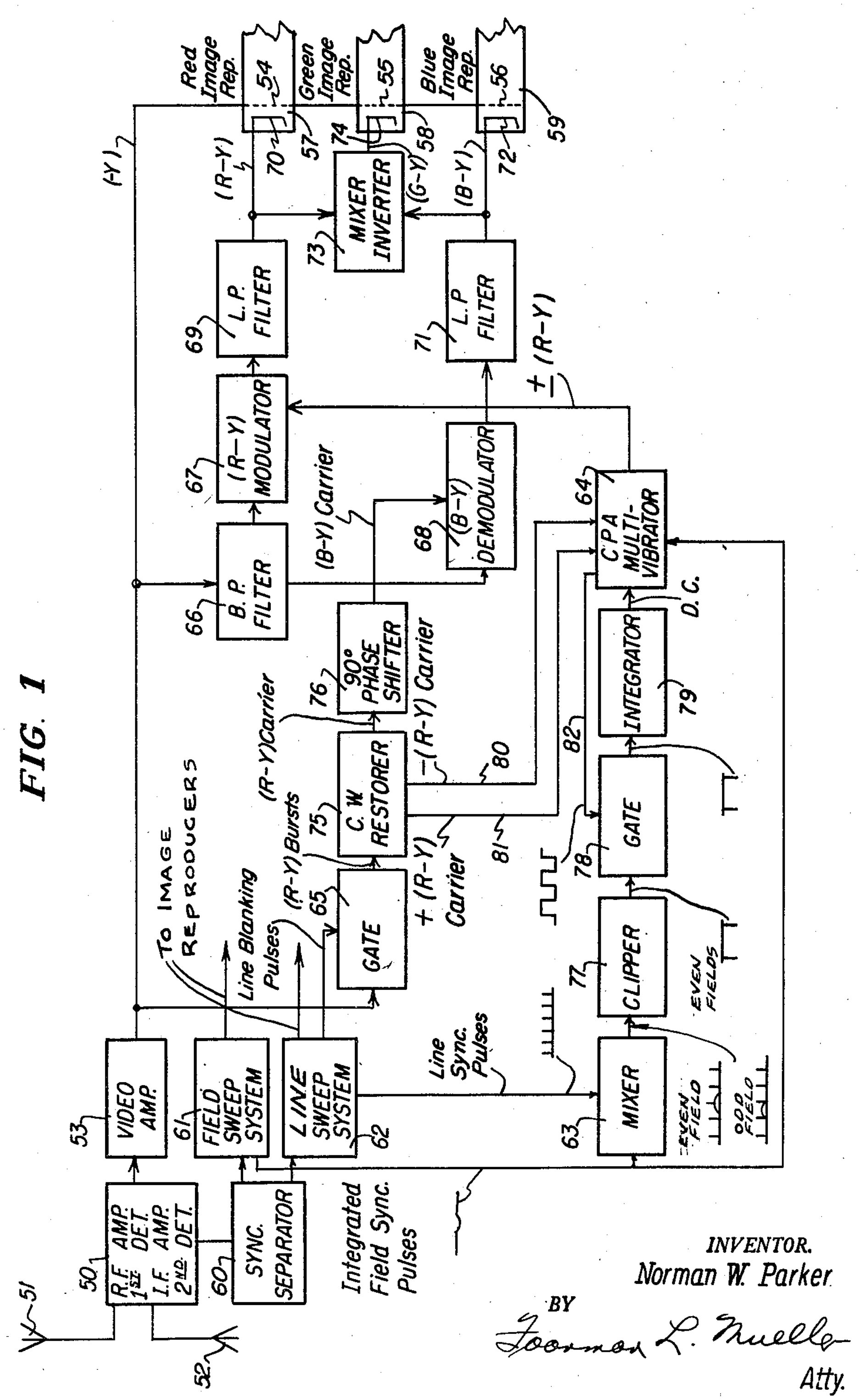

This invention relates to a color television system of the NTSC type in which monochrome information is radiated as a modulation component of a main carrier wave and color information is concurrently radiated as modulation components of one or more subcarriers modulated on the main carrier. More particularly, the invention is concerned with a control circuit for use in a receiver operating in such a color television system.

In order to achieve compatibility with existing monochrome television receivers, a color television system designated NTSC has been devised in which separate video signals are obtained at the transmitter from a suitable picture converting means representing various primary color intensities of the televised scene, and these signals are combined in a selected proportion to constitute a monochrome video signal which, in turn, is combined with line and field synchronizing components to form a television signal which is modulated on a main carrier wave. The resulting television signal conforms in all respects with present-day monochrome standards and may be reproduced in black-and-white in existing monochrome receivers. To enable the televised scene to be reproduced in color in a color television receiver, the various color video signals are mixed with the monochrome signal at the transmitter to derive a series of "color-difference" video signals, the latter being modulated on suitable subcarriers which, in turn, are modulated on the main carrier of the television signal.

Full details of the color television system mentioned above may be found in the February 1952 edition of "Electronics" magazine, published by the McGraw-Hill Corporation, in an article entitled "Principles of NTSC compatible color television" by C. J. Hirsch et al., at page 88 of that publication. As mentioned in the article, it is usual in a three-color television system to modulate the color difference signal ($b—y$), corresponding to the difference between the blue video signal and the monochrome video signal on a subcarrier having a certain phase and frequency. In addition, the color difference signal ($r—y$) corresponding to the difference between the red video signal and the monochrome video signal is modulated on a subcarrier having the aforesaid selected frequency but having a phase in phase quadrature with the phase of the ($b—y$) color difference signal subcarrier. It is only necessary to send the two previously mentioned color difference signals with the television signal, since the green color difference signal ($g—y$) may be reconstituted at the receiver by a comparison of the other two color difference signals, this being a well-known expedient.

It is desirable to establish the color subcarriers at a relatively high frequency (for example at approximately 3.9 megacycles) to reduce the visibility and distorting effects of the color modulation components in black-and-white receivers. This limits the frequency range over which upper sideband transmission may be used for the relatively broad ($r—y$) color subcarrier modulation components due to limitations in allowed bandwidth for the television signal and limitations in the response characteristics of commercial television receivers. However, the lower sidebands of this subcarrier may extend for a considerable range. These unequal sidebands result in crosstalk, but such crosstalk is effectively neutralized in the NTSC color television system by reversing the phase of the ($r—y$) subcarrier for alternate fields of the television signal. When this is done, however, it is necessary to control the demodulator for the ($r—y$) subcarrier at the receiver so that the ($r—y$) modulation components can be recovered despite the reversals of their subcarrier. That is, it is usual practice to reverse the phase of the ($r—y$) demodulating wave developed at the receiver in time coincidence with the phase reversals in the ($r—y$) subcarrier and in the proper sense so that the subcarrier reversals will have no effect on its demodulation process.

It is usual in the NTSC color television system to include in the television signal bursts of signal having a phase and frequency related to the color subcarriers, these bursts being impressed upon successive line blanking pulses in the television signal. The bursts are recovered and utilized at the receiver to develop continuous waves of proper phase and frequency for demodulating the color subcarriers. It is possible, for example, to produce at the receiver in response to the aforementioned bursts, a continuous wave corresponding in frequency and phase to the ($r—y$) subcarrier and, if it were not for the fact that the phase of that subcarrier is inverted from time to time, that continuous wave could be used directly for recovering ($r—y$) color information. However, as previously noted, the ($r—y$) subcarrier is reversed in phase during alternate fields so that it is necessary to reverse the phase of the continuous demodulating wave in time coincidence with the reversals of the ($r—y$) subcarrier in order that the phase reversals will not affect the recovery of the ($r—y$) information.

Prior systems which make use of the field synchronizing components of the color television signal to achieve the aforedescribed phase inversion of the continuous ($r—y$) demodulating wave at the proper times are known and are generally acceptable. However, such prior circuits suffer from a disadvantage in that under some conditions they are liable to be susceptible to noise and other interference which produce spurious reversals of the demodulating wave.

It is an object of the present invention to provide an improved control circuit which is not subject to the disadvantages of the prior art for use in a color television receiver for inverting the phase of a demodulating wave developed in the receiver at the appropriate times and in the correct sequence so that the wave may properly perform its demodulating function.

Another object of the invention is to provide such an improved control circuit for use in a color television receiver or the like which is relatively immune to noise disturbances or the like.

Another object of the invention is to provide such an improved control circuit for use in a color television receiver or the like which utilizes relatively few component parts and relatively uncomplicated circuitry so as to be feasible for commercial applications.

It is usual in color television receivers of the type with which the present invention is concerned to provide a multivibrator for inverting the phase of the ($r—y$) demodulating wave developed in the receiver in coincidence with phase reversals in the ($r—y$) subcarrier, and a feature of the invention is the provision of a control circuit responding to the line and field synchronizing components of the color television signal for exerting a gated control on this multivibrator so that it operates at the proper times and in the correct sequence undisturbed by noise or other interference.

Figure 2:
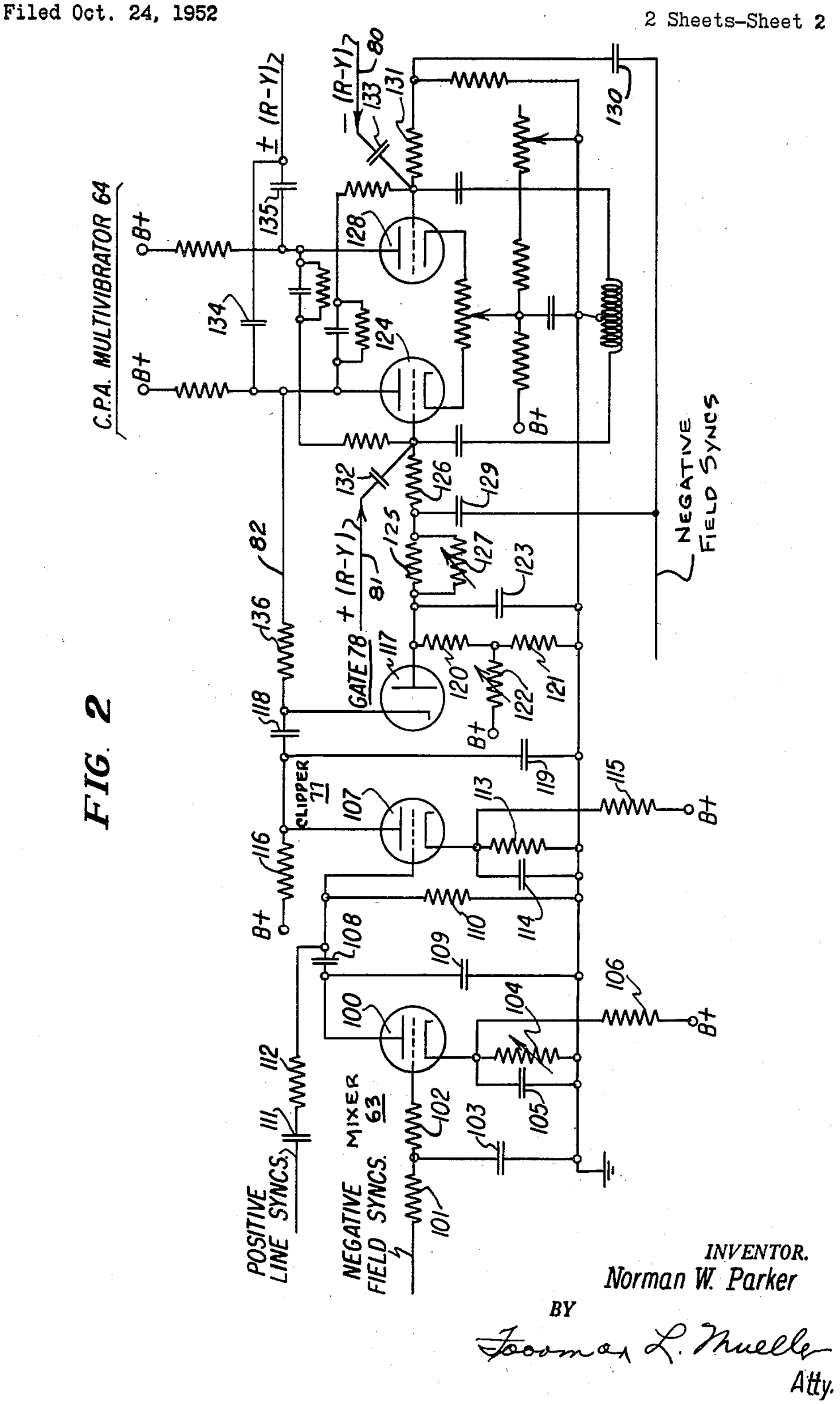

The above and other features of the invention which are believed to be new are set forth with particularly in the appended claims. The invention itself, however, together with further objects and advantages thereof may best be understood by reference to the accompanying drawings, in which:

Fig. 1 is a schematic representation of a color television receiver incorporating the invention, and Fig. 2 is a detailed representation of the control circuit of the invention.

The control circuit of the invention may be utilized in a color television receiver constructed to operate in the color television system previously described herein and which includes a trigger circuit actuated between two stable operating conditions by the field synchronizing components of the received color television signal for reversing at the proper times the phase of the continuous signal developed in the receiver for demodulating the $(r-y)$ subcarrier. The purpose of the control circuit of the invention is to maintain a preselected sequence of actuation of the trigger circuit by successive ones of the field synchronizing components so that not only is the phase of the demodulating wave inverted at the proper times, but its phase at all times corresponds to the phase of the $(r-y)$ color subcarrier. The control circuit includes a mixer and clipper network responsive to the line and field synchronizing components of the television signal for producing a control pulse in time coincidence with predetermined alternate ones of the field synchronizing components. That is, the mixer network produces a control pulse in time coincidence with, for example, the first field synchronizing pulse of each frame of the television signal. An integrating network is coupled to the mixer network for developing a control potential in response to the control pulses from the first network, and a gate circuit is interposed between the mixer and integrating networks, the gate being controlled by the trigger circuit so that it translates the control pulses from the mixer to the integrator only when the actuation of the trigger circuit by successive ones of the field synchronizing pulses is in the desired sequence. In this fashion, the integrator develops a control potential exceeding a selected threshold so long as the trigger circuit is actuated in the proper sequence by the field synchronizing pulses, but no pulses are passed to the integrator when the sequence is incorrect and the control potential gradually decreases. Finally, a connection is provided which extends from the integrator to the trigger circuit for arresting the actuation of the trigger circuit by the field synchronizing components when the control potential falls below the selected threshold. The arrangement is such that when the trigger circuit is so arrested it is established in a condition whereby the gate passes the pulses from the mixer to the integrator so that the control potential again increases above the selected threshold to restore the actuation of the trigger circuit by the field synchronizing pulses but in the desired sequence.

The television receiver of Fig. 1 includes a radio frequency amplifier, first detector, intermediate frequency amplifier and second detector designated generally as 50. The input terminals of the radio frequency amplifier of unit 50 are connected to a suitable antenna 51, 52, and the output terminals of the second detector are connected through a video amplifier 53 to the control electrodes 54, 55 and 56 of cathode-ray image reproducers 57, 58 and 59 respectively. Reproducer 57 is utilized to recover the red image, reproducer 58 is used to reproduce the green image, and reproducer 59 to reproduce the blue image; the various color images being combined optically in known fashion to produce an image in full color. It is to be noted that the image reproducers may be combined, in accordance with established practice, in a single reproducing device if so desired.

Unit 50 is also connected to a synchronizing signal separator 60 which, in turn, is connected to a field sweep system 61 and to a line sweep system 62, the sweep systems being respectively coupled to the beam deflection elements of reproducers 57—59 in accordance with standard practice. Field sweep system 61 is connected to a mixer 63 and to a color phase alternation multivibrator 64 of known construction, and supplies integrated field synchronizing pulses to these units from its input circuit. Line sweep system 62 supplies line synchronizing pulses to mixer 63 and also supplies line blanking pulses to a gate circuit 65.

Video amplifier 53 is connected to a bandpass filter 66 which, in turn, is coupled to a demodulator 67 and to a further demodulator 68. Demodulator 67 is coupled through a low pass filter 69 to the cathode 70 of image reproducer 57, while demodulator 68 is coupled through a low pass filter 71 to the cathode 72 of image reproducer 59. The output terminals of filters 69 and 71 are connected to a mixer inverter 73, the mixer having output terminals connected to the cathode 74 of reproducer 58.

Video amplifier 53 is also connected to gate circuit 65, and the output terminals of the gate are connected to a continuous wave restorer 75 of any known type, restorer 75 being coupled through a 90° phase shifter 76 to demodulator 68. The restorer usually takes the form of an oscillator synchronized as to frequency and phase by the signal from gate 65. Mixer 63 is coupled through a clipper 77 and a gate 78 to an integrating circuit 79, the latter circuit being connected to multivibrator 64. Restorer 75 is also connected to multivibrator 64 by way of leads 80 and 81, and the multivibrator is connected back to gate circuit 78 by lead 82. The units 63, 64, 77, 78 and 79 constitute the control circuit of the invention and are to be described in detail hereinafter in conjunction with Fig. 2. The other components shown in block form in Fig. 1 are well-known to the art and a detailed description thereof is believed to be unnecessary.

As previously pointed out, the color television signal to be used by the receiver of Fig. 1 includes monochrome video components $(y)$ and line and field synchronizing components modulated on a main carrier; and also includes $(b-y)$ color information modulated on a first subcarrier having a selected frequency and phase, and $(r-y)$ color information modulated on a second subcarrier having the same frequency as the first subcarrier but in phase quadrature therewith, both subcarriers being modulated on the main carrier and the phase of the second subcarrier being inverted during the second field of each frame of the television signal. The television signal also includes bursts of signal impressed on the line blanking pulses and having the frequency and phase of the $(r-y)$ subcarrier.

The above described color television signal is intercepted by antenna 51, 52 and is amplified, heterodyned to the selected intermediate frequency of the receiver, again amplified and then detected, in unit 50. The resulting detected signal is amplified in video amplifier 53 and applied to the control electrodes 54, 55 and 56 of reproducers 57, 58 and 59. The detected signal which is impressed on these control electrodes contains monochrome information $(-y)$ and also color information modulated on the two subcarriers, the subcarriers having such a high frequency that the color information supplied to the control electrodes along with the monochrome information has no noticeable effect on image reproduction.

Bandpass filter 66 is constructed to accept the selected frequency of the subcarriers so that the $(r-y)$ and $(b-y)$ subcarriers are supplied to demodulators 67 and 68. It is to be remembered that these subcarriers have like frequency but are displaced 90° in phase, and that the phase of the $(r-y)$ subcarrier is inverted during alternate fields of the television signal.

The detected signal from video amplifier 53 is also supplied to gate 65 and, since this gate is actuated by the line blanking pulses, the aforementioned $(r-y)$ bursts which were impressed on the line blanking pulses are recovered and supplied to continuous wave restorer 75. The restorer, in response to these bursts, develops a continuous wave having the phase and frequency of the $(r-y)$ subcarrier. The continuous wave from restorer 75 is shifted 90° in phase shifter 76 to produce a demodulating wave having the frequency and phase of the $(b-y)$ subcarrier, and the latter wave is impressed on demodulator 68 so that the $(b-y)$ color information may be recovered. The recovered $(b-y)$ information is supplied to cathode 72 through low pass filter 71 and, since monochrome information $(-y)$ is supplied to control electrode 56, the resultant modulation of the cathode ray beam in reproducer 59 is in accordance only with the blue information.

Continuous wave restorer 75 develops in known fashion a demodulation wave on lead 80 corresponding in frequency and phase to $-(r-y)$ subcarrier, and develops a demodulating wave on lead 81 corresponding in frequency and phase to $+(r-y)$ subcarrier. The two demodulating waves are supplied to CPA multivibrator 64 which is controlled to pass one or the other to demodulator 67 as the multivibrator is actuated by the field synchronizing pulses. When the $(r-y)$ demodulating wave supplied to demodulator 57 by multivibrator 64 is inverted in time coincidence with the inversions of the $(r-y)$ subcarrier and in the proper sequence, the $(r-y)$ color information is recovered at the demodulator and supplied to cathode 70 through low pass filter 69. Since control electrode 54 is modulated in accordance with the monochrome $(-y)$ information, the resultant modulation of the cathode ray beam in reproducer 57 is in accordance only with the red color information.

The $(r-y)$ color information from filter 69 and the $(b-y)$ color information from filter 71 are mixed in mixer inverter 73 in accordance with known practice to produce the green difference $(g-y)$ color information, the latter being supplied to cathode 74 of reproducer 58. The net modulation of the cathode ray beam in reproducer 58 is, therefore, in accordance with green color information and, in the above-described fashion, the three primary colors are reproduced in the reproducers and may be combined optically to synthesize a color image.

It is apparent that the actuation of the multivibrator 64 by the field synchronizing pulses must be in the proper sequence so that the phase of the $(r-y)$ demodulating signal supplied to the demodulator 67 is identical to that of the $(r-y)$ subcarrier at all times and not 180° out-of-phase therewith. Such control of the multivibrator is achieved by the improved arrangement of this invention. In accordance with the invention, line synchronizing pulses are applied to mixer 63 together with the integrated field synchronizing pulses, and are combined in the mixer. The relative timing of the line and field synchronizing pulses is varied during each frame of the television signal to achieve interlace in accordance with well known techniques. Because of this, at the output of mixer 63 a line synchronizing pulse appears pedestaled upon each integrated field synchronizing pulse corresponding to the even fields of the television signal frames, but not upon the field synchronizing pulses corresponding to the odd fields. The output signal from mixer 63 is applied to clipper 77 which clips the pedestal line synchronizing pulses to supply a pulse to gate circuit 78 in time coincidence with the field synchronizing pulses representing the even field of each frame of the television signal.

The control pulses from clipper 77 are supplied to integrating circuit 79 through gate 78, the integrating circuit developing a direct current control potential which, as long as the control pulses are supplied to the integrator, has a value exceeding a certain threshold and the multivibrator is unaffected thereby. However, should the control potential from integrator 79 decrease below the selected threshold, the multivibrator is arrested in a preselected one of its two stable operating conditions and is no longer capable of being triggered by the field synchronizing pulses. The square wave developed by the multivibrator due to its actuation by the field synchronizing pulses is fed back to gate circuit 78 over lead 82, and the gate passes the control pulses from clipper 77 to the integrator 79 only if negative half-cycles of the square wave occur in time coincidence with the control pulses. It is evident, that when the multivibrator is actuated in the desired sequence by the field synchronizing pulses, the square wave may be made to occur so that its negative half-cycles are in coincidence with the control pulses so that gate 78 passes the control pulses to the integrator. Now if for any reason the multivibrator is triggered in the improper sequence, the positive half-cycles of the square wave will occur in time coincidence with the control pulses from clipper 77, so that no pulses are supplied to integrator 79. Should this condition persist for a certain time interval, the D. C. control potential produced by the integrator decreases below the selected threshold arresting the operation of the multivibrator. As previously pointed out, the multivibrator is so arrested in a particular one of its two stable operating conditions so chosen that the potential on lead 82 is such that gate 78 translates the control pulses from clipper 77 to the integrator 79 so that the D. C. control potential from the integrator is soon restored and in a short interval the multivibrator may again be triggered by the field synchronizing pulses but in the desired sequence.

In this fashion, so long as multivibrator 64 is triggered by the field synchronizing pulses in the proper sequence, gate 78 opens during the even field of each frame of the television signal to allow the control pulses from clipper 77 to pass to the integrator so that the control voltage from the integrator is maintained above a selected threshold. However, when the multivibrator is triggered in the wrong sequence the gate is opened during the odd fields at the intervals of no control pulses from the clipper so that the control voltage from the integrator soon drops below the threshold. Even though the clipper may develop noise pulses during the latter intervals when the gate is open, these noise pulses do not occur with sufficient repetition over a relatively long period of time to maintain the voltage from the integrator above the threshold and it soon drops, disabling the multivibrator.

In the circuit of Fig. 2, the mixer 63 of Fig. 1 comprises an electron discharge device 100. Negative integrated field synchronizing pulses from sweep system 61 are supplied to the control electrode of device 100 through series resistors 101 and 102, the junction of these resistors being coupled to ground through a capacitor 103. The cathode of device 100 is connected to ground through a variable resistor 104 shunted by a capacitor 105, and the cathode is further connected to the positive terminal B+ of a source of unidirectional potential through a resistor 106, resistors 104 and 106 constituting a potentiometer across the source so that a controllable forced positive bias is impressed on the cathode of device 100. The anode of device 100 is coupled to the control electrode of an electron discharge device 107 through a capacitor 108 and is bypassed to ground through a capacitor 109, the control electrode of device 107 being connected to ground through a grid resistor 110. Positive line synchronizing pulses from field sweep system 61 are supplied to the junction of capacitor 108 and resistor 110 through a series connected capacitor 111 and resistor 112.

Electron discharge device 107 is connected to constitute the clipper 77 of Fig. 1 and has its cathode connected to ground through a resistor 113 shunted by a capacitor 114. The cathode of device 107 is also connected to the positive terminal B+ of a unidirectional potential source through a resistor 115, resistors 113 and 115 forming a potentiometer across the source so that a forced positive bias is impressed on the cathode of device 107. The anode of device 107 is connected to the positive terminal B+ through a load resistor 116. The anode is further coupled to the cathode of a diode 117 through a capacitor 118 and bypassed to ground through a capacitor 119.

Diode 117 is connected to form the gate 78 of Fig. 1 and has its anode connected to ground through a pair of series resistors 120 and 121, the junction of these resistors being connected to the positive terminal B+ of a unidirectional potential source through a variable resistor 122. The anode of diode 117 is bypassed to ground through a capacitor 123 and is connected to the control electrode of an electron discharge device 124 through a pair of series resistors 125 and 126, resistor 125 being shunted by a variable resistor 127 for balancing purposes.

Electron discharge device 124 and a further electron discharge device 128 are cross-connected in known fashion to form the color phase alternation multivibrator 64 of Fig. 1. The multivibrator has a first stable operating condition in which device 124 is conductive and device 128 non-conductive, and also has a second stable operating condition in which device 124 is non-conductive and device 128 conductive. The multivibrator is triggered between its two stable operating conditions by field synchronizing pulses supplied to the control electrode of device 124 through a coupling capacitor 129 and resistor 126, and to the control electrode of device 128 through a capacitor 130 and resistor 131. The $+(r-y)$ continuous wave from restorer 75 of Fig. 1 is supplied to the control electrode of device 124 through a coupling capacitor 132, and the $-(r-y)$ continuous wave derived from the restorer is supplied to the control electrode of device 128 through a coupling capacitor 133. An $(r-y)$ continuous wave is derived from the anode circuits of devices 124 and 128 through coupling capacitors 134 and 135 which has positive or negative phase depending upon which of the two devices 124 and 128 is conductive. The anode of device 124 is back-connected to the cathode of diode 117 through a resistor 136.

In the absence of a negative field synchronizing pulse on the control electrode of device 100, the positive line synchronizing pulses cause device 100 to be conductive and are attenuated by that device so that they have insufficient amplitude to render device 107 conductive. However, just before the even field of each frame of the television signal when a positive line synchronizing pulse occurs in time coincidence with the peak of an integrated field synchronizing pulse, the latter renders device 100 non-conductive so that that particular line synchronizing pulse has sufficient amplitude to render device 107 conductive and appears with negative polarity in the anode circuits of the latter device. Therefore, a negative polarity control pulse appears in the anode circuit of device 107 in time coincidence with predetermined alternate field synchronizing pulses corresponding to the even fields of the frames of the television signal.

Multivibrator 64 is triggered between its stable operating conditions by field synchronizing pulses so that the inversions of the $(r-y)$ demodulating wave occur at the proper times. However, without further control on the multivibrator it is possible for the sequence of the inversions to be incorrect so that the multivibrator supplies the $+(r-y)$ demodulating wave to demodulator 67 in the presence of the $-(r-y)$ subcarrier and vice versa. The control circuit of the present invention assures that the multivibrator will be controlled so that such a condition cannot occur.

As the multivibrator is triggered from one stable operating condition to another, a square wave is developed in the anode circuit of device 124 having negative half-cycles when device 124 is conductive and positive half-cycles when the device is non-conductive. This square wave is applied to the cathode of diode 117 so that the diode functions as a gate. That is, when the multivibrator is triggered in the proper sequence by the field synchronizing pulses, the negative half-cycles of the square wave from the anode circuit of device 124 occur in time coincidence with the negative control pulses from device 107, and the pulses are translated by the diode to the integrator to charge condenser 123 negatively. However, should the multivibrator be triggered by the field synchronizing pulses in the improper sequence, the negative control pulses from device 107 will occur in time coincidence with the positive half-cycles of the square wave from device 124. Under these conditions the control pulses are not conducted by the diode so that after a certain interval, capacitor 123 loses its negative charge and a positive bias is impressed on the control electrode of device 124. This causes the multivibrator to be paralyzed and unresponsive to the field triggering pulses in a condition in which device 124 is conductive. It is to be noted, that the paralysis of the multivibrator with device 124 in its conductive state causes the bias on diode 117 to be such that the diode passes subsequent control pulses from device 107 so that capacitor 123 again becomes charged negatively to a point that the multivibrator may again be triggered by the field synchronizing pulses but in the proper sequence.

In this fashion, multivibrator 64 is controlled by the control circuit of the invention so that should its sequence of operation be improper, the control circuit immediately paralyzes the multivibrator for a short time until the proper sequence of triggering thereof can be restored. The control circuit of the invention is relatively immune to noise disturbances since when the multivibrator is in the improper sequence there are under practically all conditions insufficient regularly occurring noise pulses to maintain the charge on capacitor 123 for any length of time so that, even in the presence of noise, the capacitor loses its charge sufficiently to paralyze the multivibrator.

The control circuit of the invention is advantageous in that it provides a positive control for the color phase alternation multivibrator in a color television receiver without the need for extraneous control signals in the color television signal. The control circuit is also advantageous in that it does not require an unduly large number of component parts or unduly complicated circuitry. Moreover, the control circuit of this invention is highly immune to noise disturbances so that proper control of the multivibrator is maintained even under adverse conditions.

While a particular embodiment of the invention has been shown and described, modifications may be made and it is intended in the appended claims to cover all such modifications as fall within the true spirit and scope of the invention.

I claim:

1. In a color television receiver for utilizing a color television signal having line and field synchronizing components whose relative timing varies at the end of each frame so that a line synchronizing pulse may appear effectively pedestaled on predetermined alternate ones of the field synchronizing pulses, and including a trigger circuit actuated between two stable operating conditions by said field synchronizing components, a control circuit for controlling the sequence of actuation of the trigger circuit by successive ones of said field synchronizing components including in combination, a mixer network responsive to said line and field synchronizing components for pedestaling a line synchronizing pulse on the predetermined alternate ones of the field synchronizing pulses, a clipper circuit for producing a control pulse in time coincidence with said predetermined alternate ones of said field synchronizing components, an integrating network for developing a control potential in response to applied pulses, a gate network controlled by the trigger circuit for passing said control pulses from said clipper network to said integrating network, said gate-circuit being actuated by output pulses from said trigger circuit of a selected polarity to pass said control pulses only when the actuation of the trigger circuit by successive ones of said field synchronizing pulses is in a desired sequence so that said integrating network develops a control potential exceeding a selected threshold during such desired sequence, and a connection extending from said integrating network to the trigger circuit for impressing said control potential on said trigger circuit to trigger said trigger circuit into a selected operating condition and to arrest the actuation thereof by said field synchronizing components when said control potential falls below said selected threshold, the trigger circuit being so triggered into said selected operating condition whereby said third network passes said control pulses so as to increase said control potential above said selected threshold and restore the actuation of the trigger circuit with the desired sequence.

2. In a color television receiver for utilizing a color television signal having line and field synchronizing components whose relative timing varies at the end of each frame so that a line synchronizing pulse may appear effectively pedestaled on predetermined alternate ones of the field synchronizing pulses and including a trigger circuit actuated between two stable operating conditions by said field synchronizing components, a control circuit for controlling the sequence of actuation of the trigger circuit by successive ones of said field synchronizing components including in combination, a mixer and clipper network responsive to said line and field synchronizing components for producing a control pulse in time coincidence with predetermined alternate ones of said field synchronizing components, an integrating network having a seelcted time constant for developing a control potential in response to applied pulses, a gate circuit interposed between said first mentioned network and said integrating network and controlled by the trigger circuit for passing the control pulses from the first mentioned network to the integrating network, said gate circuit being actuated by output pulses from said triger circuit of a selected polarity to pass said control pulses only when the actuation of the trigger circuit by successive ones of said field synchronizing pulses is in a desired sequence so that said integrating network develops a control potential exceeding a selected threshold during such desired sequence, and a connection extending from said integrating network to the trigger circuit for impressing said control potential on said trigger circuit to trigger said trigger circuit into a selected operating condition and to arrest the actuation thereof by said field synchronizing components when said control potential falls below said selected threshold, the trigger circuit being so triggered into said selected operating condition whereby said gate passes said control pulses so as to increase said control potential above said selected threshold and restore the actuation of the trigger circuit with the desired sequence.

3. A control circuit for controlling the actuation of a trigger circuit between two stable operating conditions by successive pulses of a selected repetition frequency, said control circuit including in combination, circuit means for impressing said successive pulses directly on said trigger circuit to actuate said trigger circuit between its two stable operating conditions, a first network for producing a control pulse in time coincidence with predetermined alternate ones of said successive pulses, a second network for developing a control potential in response to applied pulses, a gate network controlled by output pulses of a selected polarity from the trigger circuit for passing said control pulses from said first network to said second network only when such output pulses occur in time concidence with said control pulses which arises when the actuation of the trigger circuit by said successive pulses is in a desired sequence so that said second network develops a control potential exceeding a selected threshold during such desired sequence, and a connection extending from said second network to the trigger circuit for impressing said control potential on said trigger circuit to trigger said trigger circuit into a selected operating condition and to arrest the actuation thereof by said successive pulses when said control potential falls below said selected threshold, the trigger circuit being so triggered into said selected operating condition whereby said third network passes said control pulses so as to increase said control potential above said selected threshold and restore the actuation of the trigger circuit with a desired sequence.

4. A control circuit for controlling the actuation of a multivibrator between two stable operating conditions by successive pulses of a selected repetition frequency, said control circuit including in combination, circuit means for impressing said successive pulses directly on said trigger circuit to actuate said trigger circuit between its operating conditions, a network for producing a control pulse in time coincidence with predetermined alternate ones of said successive pulses, a gate circuit having a bias controlled by output pulses of a selected polarity from the multivibrator for translating said control pulses only when said output pulses occur in time coincidence with said control pulses, an integrating circuit having a selected time constant for developing a control potential exceeding a certain threshold in response to said control pulses from said gate, and a connection extending from said integrating network to the multivibrator for impressing said control potential on said multivibrator to trigger said multivibrator into a selected one of its two operating conditions and to arrest the actuation thereof by said successive pulses when said control potential falls below said selected threshold, the multivibrator being so triggered into said selected one of its operating conditions so that said gate translates said control pulses so as to increase said control potential above said selected threshold and restore the actuation of the multivibrator with a desired sequence.

5. A control circuit for controlling the operation of a trigger circuit between two operating conditions by successive pulses of a selected repetition frequency, said control circuit including in combination, circuit means for impressing said successive pulses directly on said trigger circuit to actuate said trigger circuit between its operating conditions, a first network for producing a series of control pulses having a predetermined relation with respect to said successive pulses, a second network for developing a control potential in response to the application of said control pulses thereto, a gate circuit interposed between said first and second networks and controlled by output pulses from the trigger circuit to pass said control pulses to said second network only when said output pulses occur in substantial time coincidence with said control pulses, and means for impressing said control potential on said trigger circuit.

References Cited in the file of this patent

UNITED STATES PATENTS

| | | |
|---|---|---|
| 2,480,582 | Houghton | Aug. 30, 1949 |
| 2,617,876 | Rose | Nov. 11, 1952 |
| 2,696,830 | Harris | Aug. 17, 1954 |
| 2,689,880 | Hollywood | Sept. 21, 1954 |
| 2,697,744 | Richman | Dec. 21, 1954 |